UNITED STATES PATENT OFFICE.

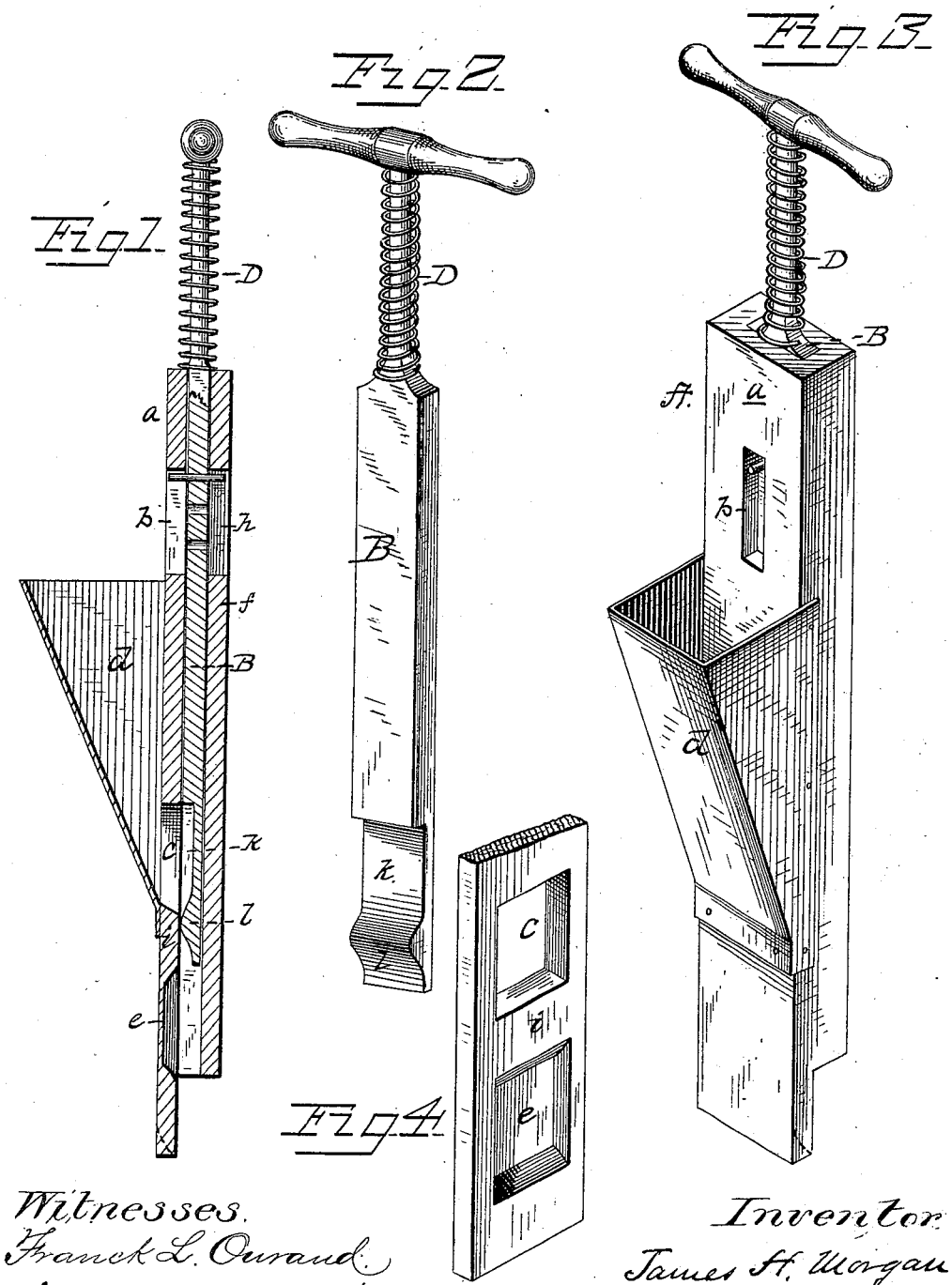

JAMES H. MORGAN, OF BENNETTSVILLE, SOUTH CAROLINA, ASSIGNOR OF ONE-HALF TO JOHN S. MOORE, OF SAME PLACE.

SEED-PLANTER.

SPECIFICATION forming part of Letters Patent No. 266,184, dated October 17, 1882.

Application filed May 16, 1882. (No model.)

*To all whom it may concern:*

Be it known that I, JAMES H. MORGAN, a citizen of the United States of America, residing at Bennettsville, in the county of Marlborough and State of South Carolina, have invented certain new and useful Improvements in Seed-Planters; and I do hereby declare the following to be a full, clear, and exact description of the invention, such as will enable others skilled in the art to which it appertains to make and use the same.

This invention relates to an implement for planting peas and other seed, and is specially designed to provide a simple, cheap, durable, and effective means for depositing the peas into the soil.

My invention consists in the novel construction, combination, and arrangement of parts, as will be hereinafter set forth.

In the accompanying drawings, forming a part of this specification, Figure 1 represents a vertical sectional view of my improved seed-planter. Fig. 2 is a perspective view of the reciprocating plunger. Fig. 3 is a perspective view of the completed planter, and Fig. 4 is a view of a part of the front casing.

The letter A represents the rectangular casing, preferably made of light wood, and having the side $a$ formed or provided with a vertical slot, $b$, the rectangular seed-opening $c$, and having attached thereto by any suitable means a funnel-shaped seed-hopper, $d$, so arranged in relation to the seed-opening $c$ in the casing that it may be emptied entirely. The inner side of the front piece, $a$, of the casing has formed in it near the lower end the chamber $e$, for the purpose of receiving a certain quantity of seed carried down by the action of the reciprocating plunger. This chamber is formed by making a depression or cavity in the material and closing the upper portion from direct intercourse with the hopper by the transverse wall $i$, as shown.

The reciprocating plunger B is made to operate easily within the rectangular chamber of the casing, and formed at the lower end with a chambered-out section, $k$, and beveled end piece, $l$, substantially as shown, into which, when the plunger is raised, the seeds drop, and from which they are deposited by the action of the plunger when pushed down. Near the upper end of the reciprocating plunger are a series of perforations for receiving a pin or bolt inserted through the rectangular slot in the casing, by which means the stroke of the plunger and the quantity of seed to be deposited are regulated.

It will be observed that the seed reaches the chamber in the plunger, and is carried downward by contact with the shoulder of the chamber into the chamber of the casing and deposited in its place in such quantity as may be desired and fixed upon by means of the regulating-pin in the plunger, operating and regulated by the dimensions of the slot.

It will also be observed that one side of the casing is made longer than the other sides, in order that the seed-passage at its lower end may not become clogged with soil during the process of planting. The slat $f$ of the casing is formed near its upper end with the vertical slot $h$, for the passage of the transverse pin or bolt, so as to secure a bearing and stop on opposite sides of the plunger.

Arranged around the upper portion of the plunger is a coiled spring, D, having its support upon the upper end of the casing. This spring will aid the planter in withdrawing the plunger for further action in charging and discharging the plunger.

What I claim as my invention is—

The combination of the rectangular frame or casing A, formed with the vertical slots $b$, seed-opening $c$, leading from the hopper, and the cavity $e$, the plunger B, formed with a cavity and beveled end, and the coiled spring surrounding the upper portion of the plunger, as described.

In testimony whereof I affix my signature in presence of two witnesses.

JAMES H. MORGAN.

Witnesses:
L. J. BURDEN,
E. S. CARLISLE.